(12) United States Patent
Jung et al.

(10) Patent No.: US 9,644,581 B2
(45) Date of Patent: May 9, 2017

(54) VARIABLE INTAKE SYSTEM WITH VARIABLE VALVE

(71) Applicants: Hyundai Motor Company, Seoul (KR); Kia Motors Corporation, Seoul (KR)

(72) Inventors: Jungwu Jung, Hwaseong-Si (KR); Seunghyun Lee, Incheon (KR); Younghak Jang, Seoul (KR); Youngho Han, Hwaseong-si (KR); Yang-rae Cho, Suwon-si (KR); Hyun-soo Jung, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 266 days.

(21) Appl. No.: 14/517,367

(22) Filed: Oct. 17, 2014

(65) Prior Publication Data

US 2015/0330339 A1 Nov. 19, 2015

(30) Foreign Application Priority Data

May 19, 2014 (KR) ........................ 10-2014-0059679

(51) Int. Cl.
*F02M 35/10* (2006.01)
*F16K 11/20* (2006.01)
*F02B 31/06* (2006.01)
*F02B 27/02* (2006.01)

(52) U.S. Cl.
CPC ... *F02M 35/10091* (2013.01); *F02B 27/0273* (2013.01); *F02B 31/06* (2013.01);
(Continued)

(58) Field of Classification Search
CPC ....... F02M 35/10091; F02M 35/10085; F02M 35/10006; F02M 35/10013;
(Continued)

(56) References Cited

U.S. PATENT DOCUMENTS 4,446,834 A * 5/1984 Yoneda .................... F02M 3/09
123/587
5,551,394 A * 9/1996 Yoshikawa ........... F02B 31/087
123/308

(Continued)

FOREIGN PATENT DOCUMENTS

JP       6-239148 A     8/1994
JP    2008-223595 A     9/2008

(Continued)

OTHER PUBLICATIONS

Machine translation for KR10-2011-0119944A, Hong, publ'n date Dec. 8, 2011, obtained from http://engpat.kipris.or.kr/engpat/, pp. 1-13.*

*Primary Examiner* — Grant Moubry
(74) *Attorney, Agent, or Firm* — Morgan, Lewis & Bockius LLP

(57) ABSTRACT

A variable intake system may include an air duct that guides intake air into an engine and a variable valve having a variable opening degree, to adjust an amount of the intake air, wherein the air duct includes a first inlet and a second inlet that may be opened to an outside, wherein the air duct has a first flow path having one end connected with the first inlet and a second flow path having one end connected with the second inlet, wherein the second flow path shares a part of the first flow path, wherein another end of the first flow path and another end of the second flow path share a same outlet, and wherein a length of the second flow path may be longer than a length of the first flow path.

13 Claims, 14 Drawing Sheets

(52) U.S. Cl.
    CPC ....... *F02M 35/10085* (2013.01); *F16K 11/20* (2013.01); *Y02T 10/146* (2013.01); *Y10T 137/86485* (2015.04); *Y10T 137/86815* (2015.04)

(58) Field of Classification Search
    CPC ....... F02M 35/10131; F02M 35/10144; F02M 35/10255; F02B 27/0268; F02B 27/0273; F02B 31/06; F16K 11/20; Y02T 10/146; Y10T 137/86815; Y10T 137/86485
    USPC ................ 123/22, 184.52, 188.1, 190.1
    See application file for complete search history.

(56) References Cited

U.S. PATENT DOCUMENTS

| | | | | |
|---|---|---|---|---|
| 6,877,723 | B2* | 4/2005 | Martinsson | F02B 25/22 123/73 PP |
| 8,127,742 | B2* | 3/2012 | Nogawa | F02B 27/02 123/184.53 |
| 8,137,425 | B2* | 3/2012 | Saito | F02M 35/02 123/198 E |
| 2010/0083929 | A1* | 4/2010 | Sakagami | F02B 27/0263 123/184.56 |

FOREIGN PATENT DOCUMENTS

| | | |
|---|---|---|
| JP | 2011-137431 A | 7/2011 |
| KR | 10-2000-0008943 A | 2/2000 |
| KR | 10-2011-0119944 A | 11/2011 |

* cited by examiner

Valve closed <low RPM>

Valve opened <high RPM>

VARIABLE INTAKE SYSTEM WITH VARIABLE VALVE

CROSS-REFERENCE TO RELATED APPLICATION

The present application claims priority of Korean Patent Application Number 10-2014-0059679 filed on May 19, 2014, the entire contents of which application is incorporated herein for all purposes by this reference.

BACKGROUND OF THE INVENTION

Field of the Invention

The present invention relates to a variable intake system, and more particularly, to a variable intake system with a variable valve, an opening degree of which is varied depending on a variation in air intake amount of a vehicle engine.

Description of Related Art

In general, in a variable intake system of a vehicle engine, air which is drawn in through an air duct is filtered by a filter disposed in an air cleaner, and a plurality of air ducts are provided to compensate for insufficient amount of intake air when the engine is operated at a high-speed and high-load region.

Air is sucked into the engine through an intake system, and engine noise is discharged to an air inlet of the air duct through the intake system.

Therefore, the intake system is generally designed to minimize flow resistance of the air flowing into the engine to improve engine output, and minimize a degree of engine noise that is transmitted to the inlet of the air duct.

Noise inside the vehicle results from various noises such as road noise, radiated sound from the engine, wind noise, and vibration in a vehicle body structure, and the aforementioned noise changes proportionally to an engine RPM and a vehicle speed, but discharge sound of engine noise is not necessarily proportional to the engine RPM.

Therefore, a degree at which the discharge sound of the engine noise affects the noise inside the vehicle is relatively large at a low engine RPM.

Therefore, in the variable intake system in the related art, two or more air ducts are provided to reduce the discharge sound at a low RPM, and reduce flow resistance of intake air at a high RPM, and a method of mounting valves in some air ducts, selectively closing the valves at a low RPM, and selectively opening the valves at a high RPM is used.

The variable intake system in the related art has a valve assembly for selectively opening and closing some of the plurality of air ducts, and an actuator which provides driving power to the valve assembly, and there are a semi-active type actuator, and an active type actuator.

Here, as the semi-active type actuator, a vacuum type actuator using a solenoid, and a spontaneous opening and closing type actuator using a magnet can be exemplified, and the active type actuator uses a DC motor.

In the related art, there are problems in that there is a spatial problem because the plurality of air ducts are adopted, and costs and weight are increased due to the plurality of air ducts and the expensive actuator.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a variable intake system which may effectively cope with a variation in engine RPM by controlling flow resistance of intake air and discharge sound of engine noise using a single air duct in which no actuator is mounted.

An exemplary embodiment of the present invention provides a variable intake system which has an air duct that guides intake air into an engine, and a variable valve having a variable opening degree, to adjust an amount of intake air, in which the air duct includes a first inlet and a second inlet that are opened to the outside, the air duct has a first flow path having one end connected with the first inlet, and a second flow path having one end connected with the second inlet, the second flow path shares a part of the first flow path, another end of the first flow path and another end of the second flow path share the same outlet, and a length of the second flow path is longer than a length of the first flow path.

In this case, a cross section of the first flow path may be larger than a cross section of a portion of the second flow path which is not shared with the first flow path.

In addition, an opening degree of the variable valve may be varied by a variation in pressure in the air duct in accordance with a variation in amount of intake air.

The variable valve may be mounted at one end of the first flow path to open and close a part of the first flow path which is not shared with the second flow path.

In the variable intake system according to the exemplary embodiment of the present invention, when the variable valve is opened, all of the air flowing in through both the first inlet and the second inlet may be supplied to the engine, and when the variable valve is closed, only air flowing in through the second inlet may be supplied to the engine.

The variable valve may include a valve flap rotating on an axis perpendicular to a length direction of the first flow path and having a shape that is selectively almost identical to a cross section of the first flow path.

The variable valve may further include, a valve hinge which is an axis on which the valve flap rotates, and a valve spring which has one end supported by the valve flap, and another end supported by the air duct, and provides restoring force to the valve flap which rotates on the valve hinge as a rotation axis.

The variable valve may further include a valve stopper which is formed or mounted at a left end portion or a right end portion from the valve hinge in a cross section of the variable valve in a length direction of the first flow path.

The valve hinge may be positioned at an upper portion in the cross section in the length direction of the first flow path, and the valve stopper may be an elastic member that is mounted at an end portion of the valve flap which is closer to the valve hinge.

The valve flap may have a shape in which a lower portion of the valve flap is bent to form a predetermined angle with an upper portion of the valve flap in a cross section of the valve flap in the length direction of the first flow path or a shape in which the valve flap gradually curves toward the lower portion thereof, such that a lower end of the valve flap is spaced apart from an extended line which connects a center of the valve hinge and the upper portion of the valve flap in a direction in which the valve flap is opened, in a cross section of the valve flap in the length direction of the first flow path.

A stopping projection or a stopping groove may be formed or mounted at an upper side or a lower side of a cross section of the air duct in the length direction thereof so that an upper end or a lower end of the valve flap is caught by the stopping projection or the stopping groove so as for the valve flap to be stopped.

In the variable intake system according to the exemplary embodiment of the present invention, when the variable valve is closed or when the variable valve is opened, air column resonance frequency may be adjusted to be increased or decreased in accordance with $$\text{Air Column Resonance Frequency} = \frac{\text{Sound Velocity}}{2 \times \left( \begin{array}{c} \text{Length of Air Column} + \\ 0.3 \times \text{Diameter of Air Column} \end{array} \right)} \times \text{Integer } (1, 2, \ldots)$$

wherein a length of the first flow path is L1, a length of a portion of the second flow path, which is not shared with the first flow path, is L2, a length of the second flow path is L1+L2, a diameter of a cross section of the first flow path is D1, a diameter of a cross section of a part of the second flow path, which is not shared with the first flow path, is D2, when the variable valve is closed, a length of the air column is L1+L2 and a diameter of the air column is an arbitrary value associated with D1 and D2, and when the variable valve is opened, the length of the air column is L1 and the diameter of the air column is D1.

A plurality of the first inlets may be formed, a plurality of the first flow paths may be formed accordingly, and the at least one variable valve may be selectively mounted at least one end of the plurality of the first flow paths.

Moreover, a plurality of the air ducts according to the exemplary embodiment of the present invention may be provided.

The methods and apparatuses of the present invention have other features and advantages which will be apparent from or are set forth in more detail in the accompanying drawings, which are incorporated herein, and the following Detailed Description, which together serve to explain certain principles of the present invention.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings so that those skilled in the Field of the Invention to which the present invention pertains may easily carry out the present invention.

The exemplary embodiment is an exemplary embodiment according to an exemplary embodiment of the present invention, and since the present invention may be implemented in various different ways by those skilled in the Field of the Invention to which the present invention pertains, the scope of the present invention is not limited to the exemplary embodiment that will be described below.

Throughout the specification and the claims, unless explicitly described to the contrary, the word "comprise" and variations such as "comprises" or "comprising" will be understood to imply the inclusion of stated elements but not the exclusion of any other elements.

In addition, the terms of constituent elements do not limit corresponding functions of the constituent elements.

Figure 1:
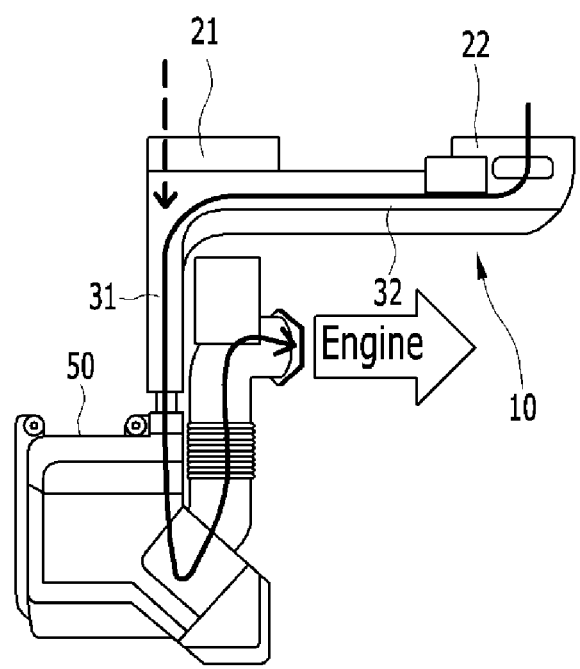
FIG. 1 is a view illustrating an air flow from an inlet of a variable intake system according to an exemplary embodiment of the present invention to an engine.

FIG. 1 is a view illustrating an air flow from an inlet of a variable intake system according to an exemplary embodiment of the present invention to an engine.

Figure 2:
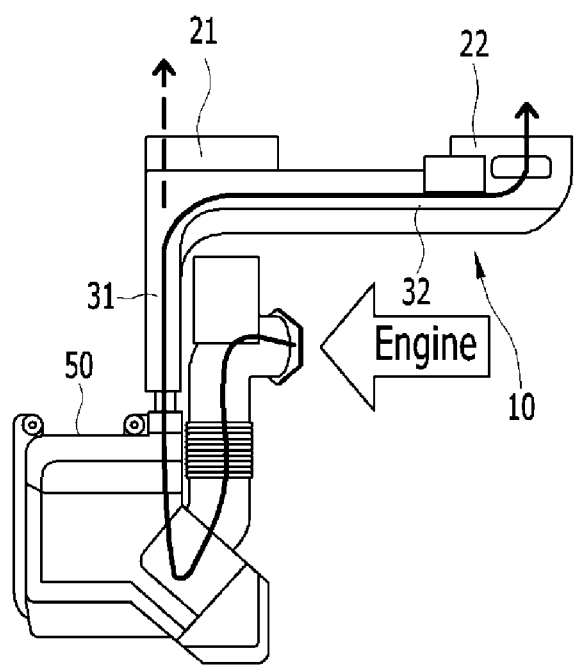
FIG. 2 is a view illustrating noise propagation from the engine to the inlet of the variable intake system according to the exemplary embodiment of the present invention.

FIG. 2 is a view illustrating noise propagation from the engine to the inlet of the variable intake system according to the exemplary embodiment of the present invention.

In FIG. 1, air is sucked into an engine through an intake system, and in FIG. 2, engine noise is discharged to an inlet through the intake system.

The aim of the intake system is to minimize resistance against a flow of air, which flows into the engine, to improve engine output, and minimize noise propagation from the engine to the inlet.

A variable intake system according to an exemplary embodiment illustrated in FIGS. 1 and 2 has an air duct 10, unlike the variable intake system in the related art.

The air duct 10 is a single pipe structure that guides intake air to a combustion chamber of the engine.

An inlet, which is opened to the outside, is formed at one end of the air duct 10, and an air cleaner 50 may be connected to another end.

Therefore, intake air flows from the inlet of the air duct 10 along a single flow path formed in the air duct 10, and flows into the engine after impurities are filtered by the air cleaner 50.

A plurality of air ducts 10 were used in the related art, but the variable intake system according to the exemplary embodiment of the present invention is intended to minimize air flow resistance and engine noise propagation using the single air duct 10.

To this end, the variable intake system according to the exemplary embodiment of the present invention includes two inlets, that is, a first inlet 21 and a second inlet 22 formed in the single air duct 10.

The first inlet 21 is formed to be closer to the air cleaner 50 than other flow paths, and the second inlet 22 is formed to be farthest from the air cleaner 50, and may be formed at one end of the air duct 10.

Therefore, the single flow path may be divided into two flow paths by the first inlet 21 and the second inlet 22.

That is, a first flow path 31 having one end connected with the first inlet 21 and a second flow path 32 having one end connected with the second inlet 22 may be formed together.

In this case, the second flow path 32 may share a part of the first flow path 31.

The reason is that because of the structure having the single air duct 10, the single flow path structure needs to remain when the first inlet 21 is closed.

The reason why the second flow path 32 shares a part of the first flow path 31 instead of the entirety of the first flow path 31 is that one end of the first flow path 31 is directed toward the first inlet 21 that is opened to the outside, and an opening of the first flow path 31, which may be shared by the second flow path 32, is only the opening that is directed toward the second inlet 22.

That is, the second flow path 22 cannot share the opening that is directed toward the first inlet 21 in the first flow path 31.

Structurally, a length of the second flow path 32 is longer than a length of the first flow path 31, and the second flow path 32 includes a part of the first flow path 31, such that another end of the first flow path 31 and another end of the second flow path 32 share the same air outlet.

Figure 3:
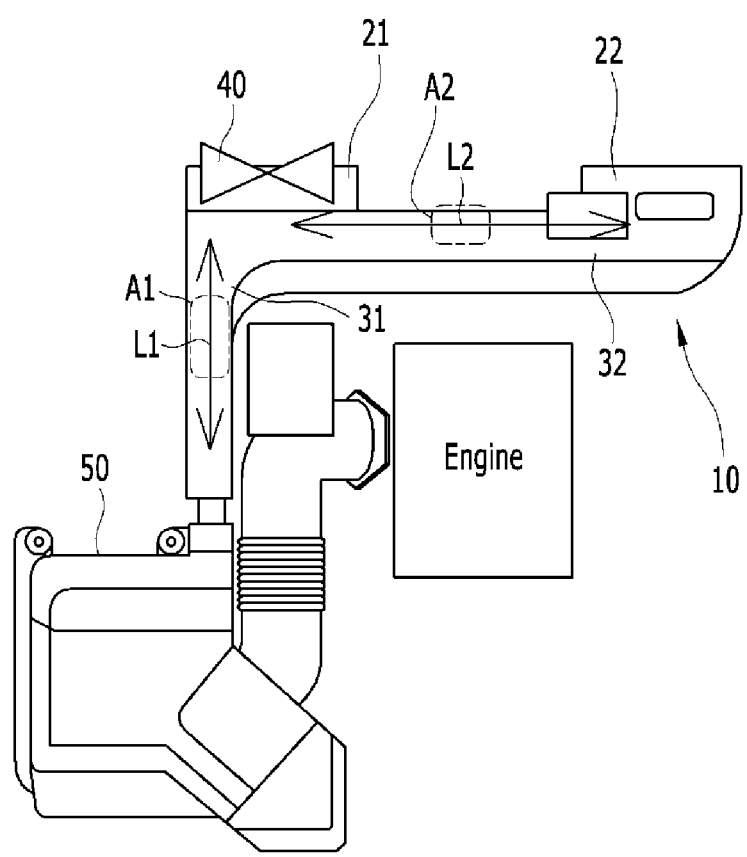
FIG. 3 is a schematic view of constituent elements of the variable intake system according to the exemplary embodiment of the present invention.

FIG. 3 is a schematic view of constituent elements the variable intake system according to the exemplary embodiment of the present invention.

Referring to FIG. 3, the variable intake system according to the exemplary embodiment of the present invention includes the single air duct 10 including the first inlet 21 and the second inlet 22, and a variable valve 40.

An opening degree of the variable valve 40 may be varied due to a variation in pressure in the air duct 10 according to a variation in amount of intake air.

That is, the variable valve 40 may be opened and closed by an actuator, but may be autonomously opened and closed depending on a flow rate of intake air that is varied in accordance with an engine RPM when a vehicle is accelerated or decelerated.

The reason is that as the engine RPM is increased, force of sucking air becomes greater, and a flow rate of intake air is increased.

To this end, the variable valve 40 according to the exemplary embodiment of the present invention may utilize a spring.

The variable valve 40 may be mounted at one end of the first flow path 31 that is connected to the first inlet 21.

By the variable valve 40, a part of the first flow path 31, which is not shared with the second flow path 32, is opened and closed.

When the variable valve 40 is opened, one end of the first flow path 31 communicates with the first inlet 21 so that air is sucked, and when the variable valve 40 is closed, an inflow and an outflow of air between the first flow path 31 and the first inlet 21 may be shut off.

The same operation is performed even in case the variable valve 40 is mounted at one end of the second flow path 32 that is connected to the second inlet 22.

The length of the first flow path 31 is L1, and a length of the portion of the second flow path 32, which is not shared with the first flow path 31, is L2.

Therefore, the length of the second flow path 32 is L1+L2.

Here, the concepts of L1 and L2 are different from a concept of distance, and even in case a flow path is curved, a length of the curved portion is added.

Referring to FIG. 3, a cross section of the first flow path 31 is A1, and a cross section of the portion of the second flow path 32, which is not shared with the first flow path 31, is A2.

The flow path may be formed so that an area of A1 is larger than an area of A2.

When the variable valve 40 is opened, the entirety of air flowing in through the first inlet 21 and the second inlet 22 is supplied to the engine, and when the variable valve 40 is closed, only air flowing in through the second inlet 22 is supplied to the engine.

Because when the engine RPM is low the engine output is low, intake flow resistance is not greatly problematic even in case the cross section of the second flow path 32 is small and the length of the second flow path 32 is long, and the engine noise is reduced by being discharged through the second inlet 22 that is positioned to be farthest from a noise source.

When the engine RPM is high, the force of sucking air to the engine becomes greater, and the variable valve 40 is slowly opened by a difference in pressure between front and rear sides of the variable valve 40, such that air is sucked through both the first flow path 31 and the second flow path 32.

A degree at which discharge sound of the engine noise affects interior noise is low at a low RPM, the discharge sound does not greatly affect the interior noise even though both the first inlet 21 and the first inlet 22 are opened.

Therefore, even though the single air duct 10 is provided in the variable intake system according to the exemplary embodiment of the present invention, and an expensive actuator is not used, the minimization of air flow resistance, and the minimization of engine noise propagation may be achieved.

Figure 4:
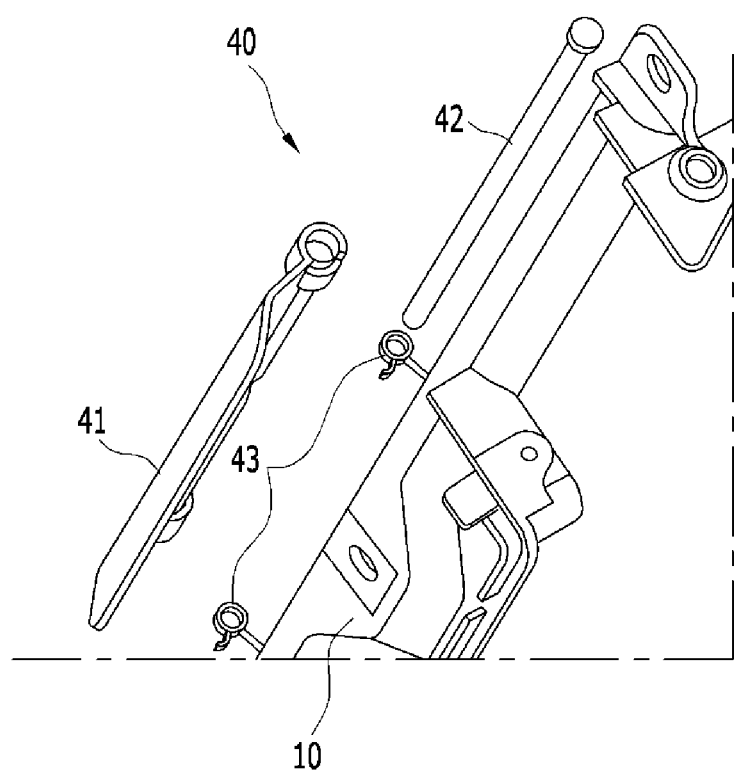
FIG. 4 is a view illustrating constituent elements of a variable valve according to the exemplary embodiment of the present invention.

FIG. 4 is a view illustrating constituent elements of the variable valve according to the exemplary embodiment of the present invention.

Referring to FIG. 4, the variable valve 40 according to the exemplary embodiment of the present invention includes a valve flap 41 which is a structure that opens or closes one end of a flow path.

In case the valve flap 41 is mounted at one end of the first flow path 31, the valve flap 41 rotates on an axis perpendicular to a length direction of the first flow path 31, such that one end of the first flow path 31 may be opened or closed.

Therefore, the valve flap 41 needs to have a shape that may cover most of the cross section the first flow path 31 at an initial position thereof.

That is, the valve flap 41 may be formed to have a shape that is almost identical to a shape of the cross section of the first flow path 31.

In addition, the variable valve 40 according to the exemplary embodiment of the present invention may further include a valve hinge 42 which serves as an axis on which the valve flap 41 rotates, and valve springs 43 which provide restoring force to the rotational motion of the valve flap 41.

One end of the valve spring 43 is supported by the valve flap 41, and another end of the valve spring 43 is supported by the air duct 10, such that when the valve flap 41 is rotated, restoring force is generated in a direction opposite to a direction in which the valve flap 41 is rotated, in accordance with rotational displacement.

That is, the valve spring 43 may be a kind of torsion spring.

When the amount of intake air is increased as the engine RPM is increased, the variable valve 40 is gradually opened due to a difference in pressure between the front and rear sides of the valve flap 41 in the length direction of the first flow path 31, while overcoming elastic force (or restoring force) of the valve spring 43.

In the moment when a driver takes his/her foot off an accelerator pedal, the valve flap 41 may return to an original position by restoring force of the valve spring 43.

In FIG. 4, the valve hinge 42 is mounted to penetrate the valve springs 43 and the valve flap 41 that are fixedly supported on the air duct 10, and may support the valve flap 41 so that the valve flap 41 is rotatable.

Figure 5:
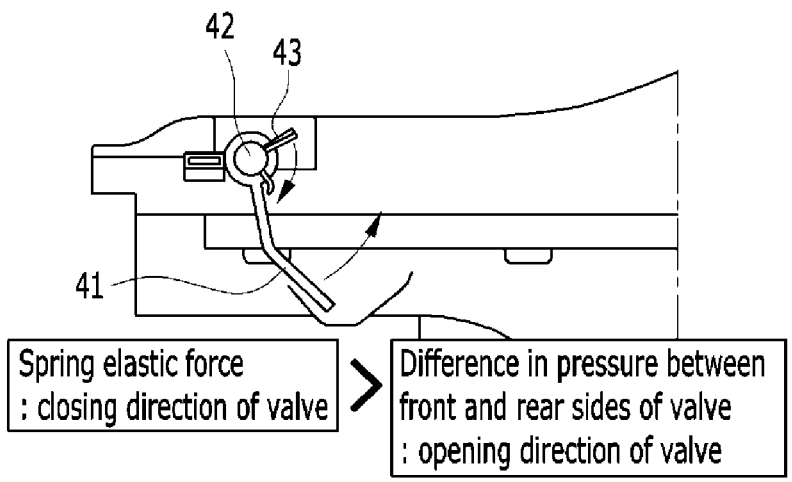
FIG. 5 is a view illustrating an operation principle of the variable valve according to the exemplary embodiment of the present invention.
Figure 5:
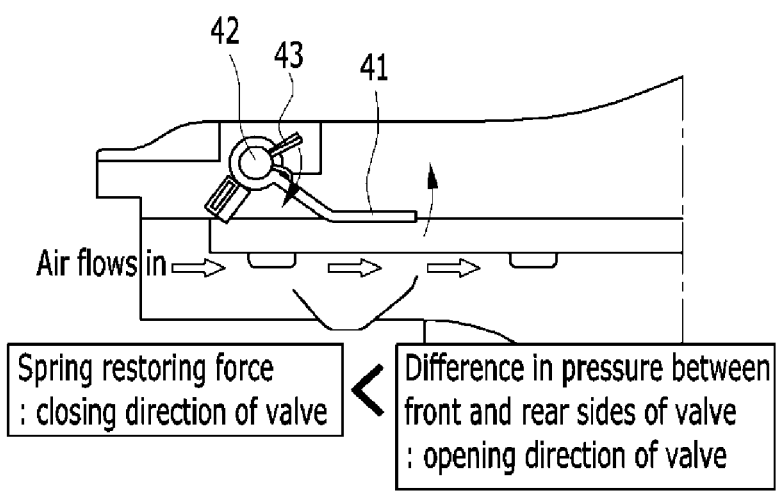

FIG. 5 is a view illustrating an operation principle of the variable valve according to the exemplary embodiment of the present invention.

Valve operation mechanisms at a low RPM and at a high RPM are illustrated, respectively.

As described above, at a low RPM, elastic force of the valve spring 43, which is applied in the direction opposite to the direction in which the valve flap 41 is rotated, overcomes the force in a rotation direction due to the difference in pressure between the front and rear sides of the valve flap 41, and as a result, the valve flap 41 is closed.

At a high RPM, the force in a rotation direction due to the difference in pressure between the front and rear sides of the valve flap 41 overcomes the restoring force of the valve spring 43 which is applied in the direction opposite to the direction in which the valve flap 41 is rotated, and as a result, the valve flap 41 is opened.

A point of time at which the variable valve 40 is opened, and an opening degree of the variable valve 40 may be adjusted by changing a shape of the valve flap 41 such as a degree at which the valve flap 41 is curved or whether surface protrusions are present or not, a weight of the valve flap 41, and characteristics of the valve spring 43.

According to the exemplary embodiment of the present invention, the operations of opening and closing the variable valve 40 depend on only the spring force unlike the related art, costs and weight are reduced in comparison with a case in which a magnet or a solenoid valve is used.

In contrast, the present invention has an additional problem.

That is, in a low RPM and high load condition (for example, when an accelerated pedal is fully pressed in a low gear stage), the variable valve 40 is vibrated due to pulsations of intake air in the engine, and very strong impact sound is generated when the variable valve 40 returns to the original position.

This is caused by a collision between a lower end of the valve flap 41 of the variable valve 40 and the air duct 10, and although noise is reduced in case a thickness of an elastic member installed on a lower end portion of the valve flap 41 is increased, the noise does not disappear because impact energy is very great.

Figure 6:
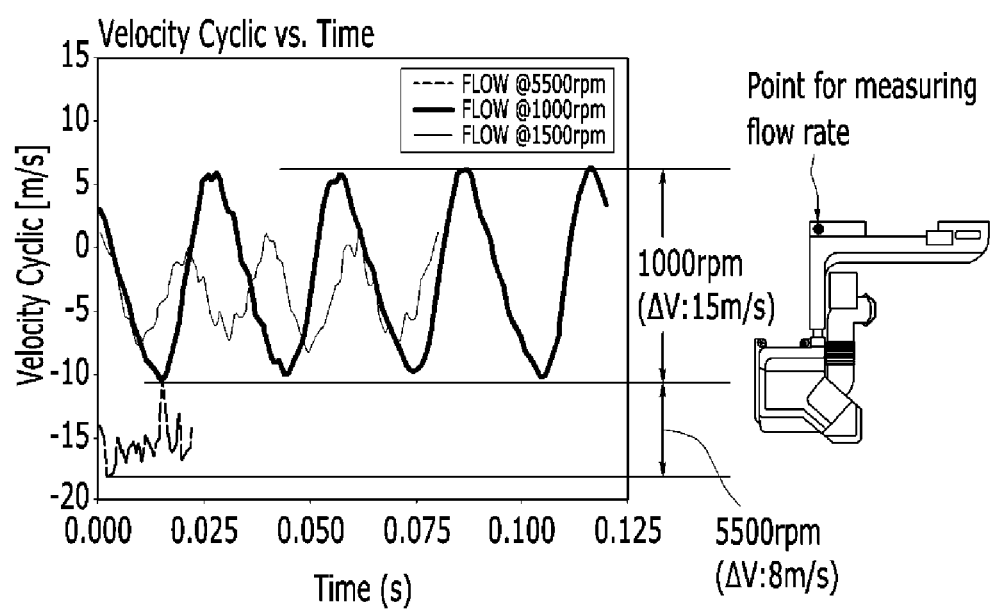
FIG. 6 is a graph illustrating pulsations of air flows in an inlet of an air duct according to the exemplary embodiment of the present invention.

FIG. 6 is a graph illustrating pulsations of air flows in the inlet of the air duct according to the exemplary embodiment of the present invention.

As shown in FIG. 6, a position of a point at which flow rates are measured to recognize pulsations of air in the air duct 10 is a specific point in the vicinity of the first inlet 21.

The graph in FIG. 6 illustrates air flows in the first inlet 21 for one cycle, that is, for four cycles because the engine has four cylinders, at the time of a full acceleration. The negative (−) sign indicates a flow toward the engine, and a value, which is greater than zero, indicates a flow toward the first inlet 21 from the engine.

The reason why a graph length is short at a high RPM is that one cycle ends in a shorter time.

It should be noted that a speed of the air flow is varied, that is, pulsates along the sequence of strokes of suction, compression, combustion and exhaust, and a maximum size of the variation of the flow speed (pulsation) is 15 m/s at 1,000 RPM, and 8 m/s at 5,500 RPM, and as a result, the size of pulsation is rather decreased as the RPM is increased.

In particular, considering that an average flow speed is 15 m/s at 5,500 RPM, it can be seen that the size of the pulsation may greatly affect the operation of the variable valve 40.

Moreover, the size of the pulsation is great at a low RPM, and a pulsation in which a direction of a flow is reversed in a + direction, that is, in a direction toward the first inlet 21 is generated.

Therefore, it is possible to deduce that the problem with impact sound, which occurs when the valve flap 41 returns to the original position and is not solved even by adding an elastic member to a lower end of the valve flap 41, is caused by an increase in size of the pulsation at a low RPM, and the pulsation that is reversed toward the first inlet 21.

To properly cope with the aforementioned situation, considering that a rotational speed of the valve flap 41 is increased as the valve flap 41 becomes far away from the valve hinge 42, and as a result, an impact amount is increased, the problem with impact sound may be solved by removing a stopper at the lower end of the valve flap 41 which is far apart from the valve hinge 42, and installing a stopper having a sufficient size in the vicinity of the valve hinge 42.

Figure 7:
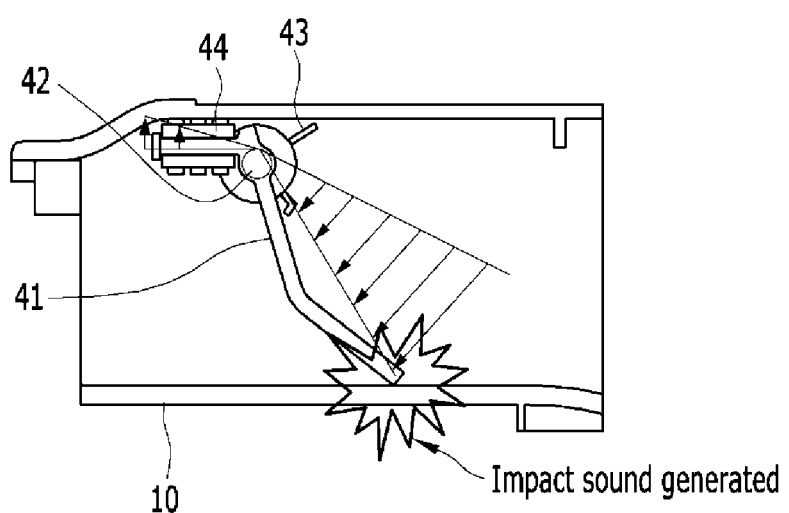
FIG. 7 is a cross-sectional view in a length direction of the air duct in which the variable valve according to the exemplary embodiment of the present invention is installed.

FIG. 7 is a cross-sectional view in a length direction of the air duct in which the variable valve according to the exemplary embodiment of the present invention is installed.

Figure 8:
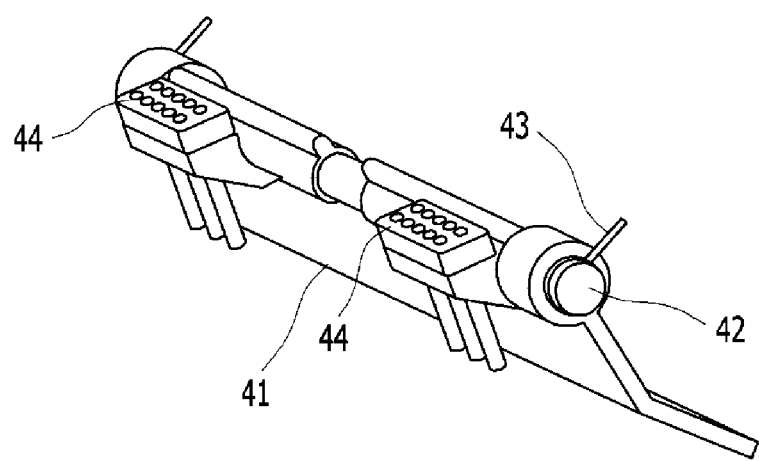
FIG. 8 is a perspective view of the variable valve in which a valve stopper according to the exemplary embodiment of the present invention is mounted.

FIG. 8 is a perspective view of the variable valve in which a valve stopper according to the exemplary embodiment of the present invention is mounted.

Figure 9:
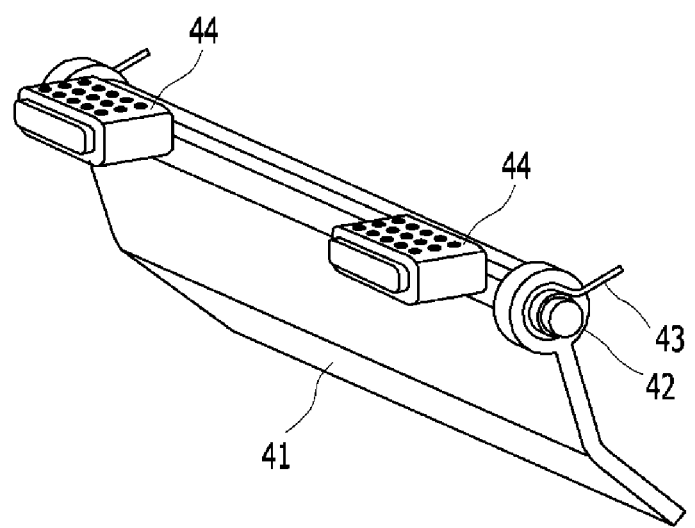
FIG. 9 is a perspective view of the variable valve in which a valve stopper according to another exemplary embodiment of the present invention is mounted.

FIG. 9 is a perspective view of the variable valve in which a valve stopper according to another exemplary embodiment of the present invention is mounted.

Referring to FIG. 7, the variable valve 40 of the variable intake system according to the exemplary embodiment of the present invention may further include a valve stopper 44.

In FIG. 7, the valve stopper 44 is formed or mounted at a left end portion from the valve hinge 42, in a cross section of the variable valve 40 in a length direction of the first flow path 31.

However, the exemplary embodiment of the present invention is not limited thereto, and the valve stopper 44 may also be formed or mounted at a right end portion.

However, in case the valve stopper 44 is formed or mounted at the left end portion as described above, an impact amount is reduced, thereby more effectively solve the problem with impact noise, in comparison with a case in which the valve stopper 44 is formed or mounted at the right end portion.

In FIG. 7, the reason why the left end portion of the variable valve 40 is a portion in the vicinity of the valve hinge 42 is that the valve hinge 42 is positioned at an upper portion of the cross section in the length direction of the first flow path 31 to easily open the flow path.

If the valve hinge 42 is positioned at an intermediate portion in a height direction of the flow path, a position or a structure of the valve stopper 44 may be changed.

Exemplary embodiments of the valve stopper 44 are illustrated in FIGS. 8 and 9.

In general, the valve stopper 44 may be an elastic member which may be mounted on an end portion of the valve flap 41 which is closer to the valve hinge 42.

Another additional problem of the present invention is that the opening degree of the valve flap 41 may be insufficient by a weight of the valve flap 41 and spring force when there is a maximum amount of intake air in the engine.

In this case, as intake flow resistance becomes higher, engine output may be reduced.

Although the spring force of the valve spring 43 is decreased in half, the problem is not solved, and when the spring force is excessively decreased, the valve flap 41 cannot return.

Figure 10:
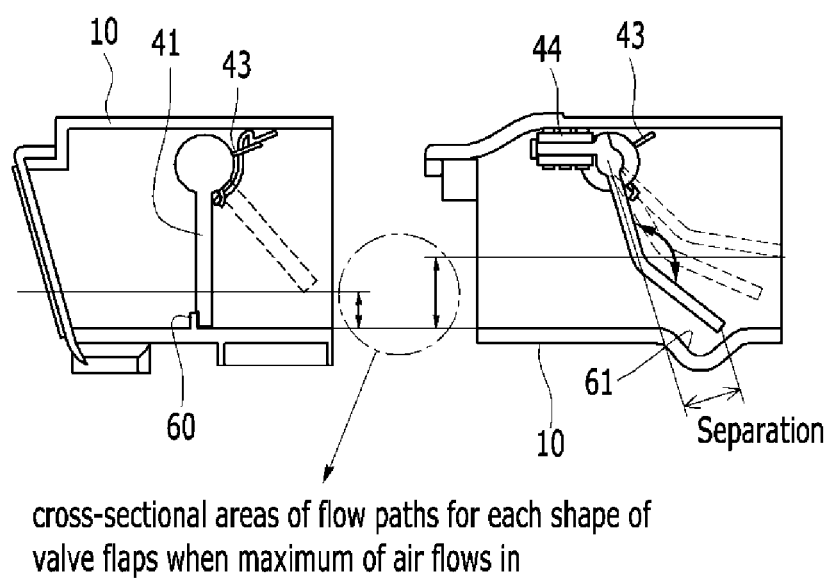
FIG. 10 is a cross-sectional view in the length direction of the air duct which illustrates how a cross-sectional area of a flow path is varied in accordance with a shape of a valve flap according to the exemplary embodiment of the present invention.

FIG. 10 is a cross-sectional view in the length direction of the air duct which illustrates how a cross-sectional area of a flow path is varied in accordance with a shape of a valve flap according to the exemplary embodiment of the present invention.

Figure 11:
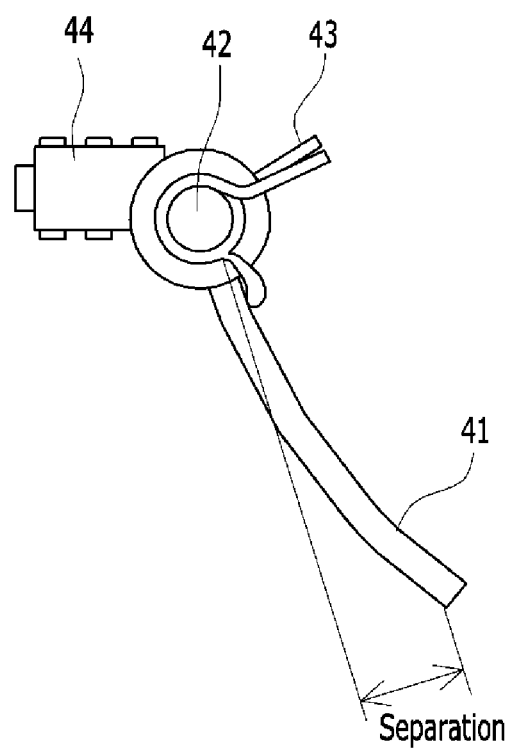
FIG. 11 is a side view of a valve flap having a curved shape according to yet another exemplary embodiment of the present invention.

FIG. 11 is a side view of the valve flap having a curved shape according to yet another exemplary embodiment of the present invention.

Referring to FIG. 10, in the variable intake system according to the exemplary embodiment of the present invention, since negative pressure, which is formed at a rear side of the valve flap 41 in the length direction of the air duct 10 by force of sucking air to the engine, is an important factor regarding the rotational motion of the valve flap 41, a side shape of the valve flap 41 is bent such that the rotational motion can be more easily performed and a variation in cross-sectional area of the flow path can be maximized.

FIG. 10 illustrates a shape in which a lower portion of the valve flap 41 is bent to form a predetermined angle with an upper portion of the valve flap 41 in a cross section of the valve flap 41 in the length direction of the flow path, and FIG. 11 illustrates a shape in which the valve flap 41 gradually curves from the upper portion to the lower portion in a cross section of the valve flap 41 in the length direction of the flow path.

As illustrated in FIGS. 10 and 11, in the shape of the valve flap 41, a lower end of the valve flap 41 is spaced apart from an extended line which connects a center of the valve hinge 42 and the upper portion of the valve flap 41 in a direction in which the valve flap 41 is opened.

By the various exemplary embodiments according to an exemplary embodiment of the present invention, the shape of the valve flap 41 may be variously changed, such that a variation in cross-sectional area of the flow path may be tuned in accordance with targets of intake air flow performance and noise attenuation performance.

FIG. 10 illustrates a stopping projection 60 and a stopping groove 61 according to the exemplary embodiment of the present invention.

The stopping projection 60 or the stopping groove 61 is formed or mounted at an upper side or a lower side of a cross section of the air duct 10 in the length direction thereof, such that an upper end or a lower end of the valve flap 41 is caught by the stopping projection 60 or the stopping groove 61 so as for the valve flap 41 to be stopped when the valve flap 41 returns to the original position.

Moreover, the stopping projection 60 or the stopping groove 61 also serves to determine an initial position of the valve flap 41.

In FIG. 10, appearances are shown in which the stopping projection 60 and the stopping groove 61 are formed at the lower portion of the air duct 10, respectively.

Figure 12:
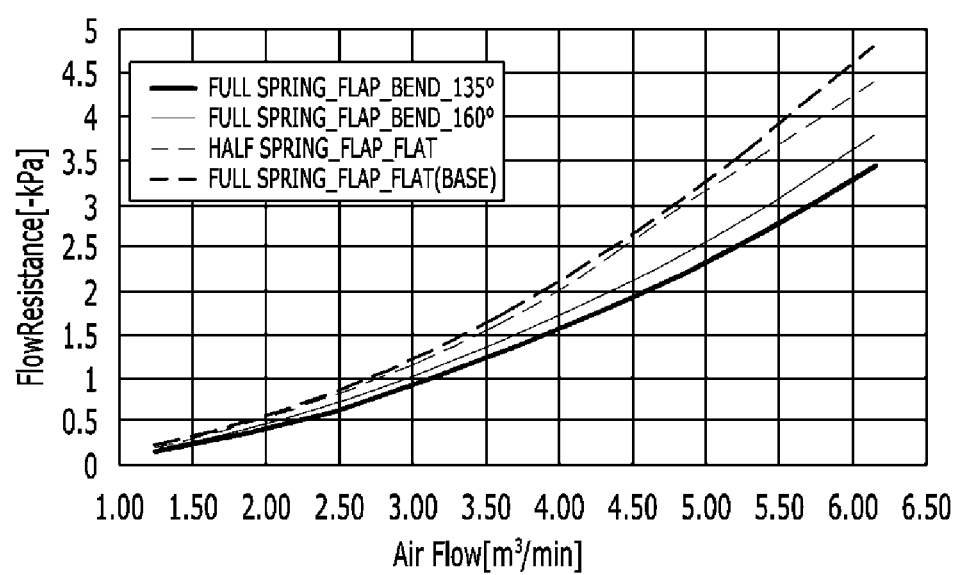
FIG. 12 is a graph for comparing air flow resistance according to the shapes of the valve flap.

FIG. 12 is a graph for comparing air flow resistance according to the shapes of the valve flap.

Referring to FIG. 12, intake flow resistance is maximally decreased by 0.5 kPa when the spring force is decreased in half, but intake flow resistance can be maximally decreased by 1.3 kPa when the shape of the valve flap 41 is changed (when the valve flap 41 is bent).

Figure 13:
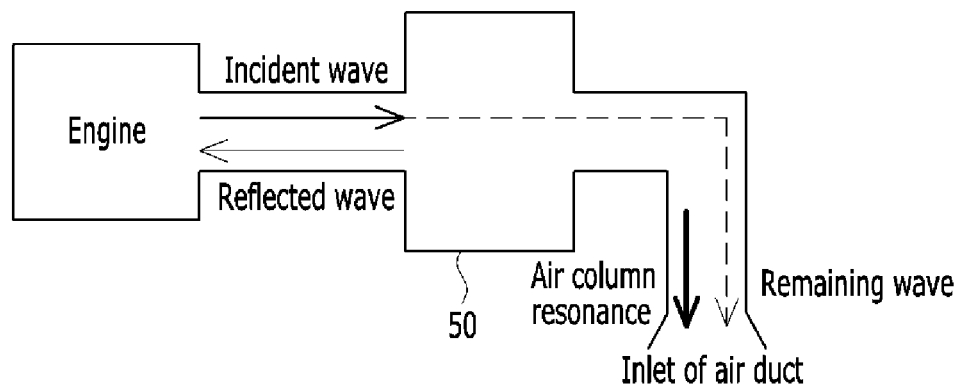
FIG. 13 is a schematic view illustrating a principle of sound propagation in the intake system.

FIG. 13 is a schematic view illustrating a principle of sound propagation in the intake system.

Referring to FIG. 13, a sound wave transmitted from the engine causes sound reflection due to a difference in sound impedance at the air cleaner 50 where the cross section is rapidly enlarged, and the reflected wave may be attenuated through sound interference or superimposition with an incident wave from the engine.

The remaining sound wave, which is continuously propagated after being attenuated while passing through the air cleaner 50, is discharged to the inlet via the air duct 10, and in this case, the remaining sound wave excites a sound field in the air duct 10, such that air column resonance may be generated at a specific frequency region due to a geometric shape.

This is an additional noise source.

The air column resonance frequency is determined by Formula 1, that is, a theoretical sound formula, and is determined mainly by the length of the flow path of the air duct 10 rather than a diameter of the flow path of the air duct 10.

Formula 1 is a relationship formula in case the cross section of the air duct 10 is circular, but a tendency of the variation of the air column resonance frequency depends on Formula 1 even in case of the cross section being not circular.

$$\text{Air Column Resonance Frequency} = \frac{\text{Sound Velocity}}{2 \times \left(\begin{array}{l}\text{Length of Air Column}+ \\ 0.3 \times \text{Diameter of Air Column}\end{array}\right)} \times \text{Integer } (1, 2, \ldots) \quad (1)$$

According to Formula 1, it can be seen that although a difference in maximum sound pressure level is not great, a position of the engine RPM where noise is generated, that is, the resonance frequency may be varied.

For example, as a length of the air column becomes longer, the air column resonance frequency becomes smaller because a denominator of Formula 1 becomes great.

Referring to FIG. 3 again, when the length of the first flow path 31 is L1, the length of the second flow path 32 is L1+L2, a diameter of the cross section of the first flow path 31 is D1, and a diameter of a cross section of a part of the second flow path 32, which is not shared with the first flow path 31, is D2, the variable valve 40, which is positioned at one end of the first flow path 31 toward the first inlet 21, is closed at a low RPM, and in Formula 1, the length of the air column is L1+L2, and the diameter of the air column is an arbitrary value associated with D1 and D2.

The reason is because D1 may be greater than D2. Since the influence by the length of the air column is larger, the tuning of the air column resonance frequency is not greatly problematic even though an intermediated value between D1 and D2 is applied to the diameter of the air column in Formula 1.

As the length of the air column is lengthened to L1+L2, first air column resonance frequency becomes relatively very small, and as a result, first air column resonance is generated in a situation in which the engine RPM is very low.

In this case, the engine RPM can be converted into frequency (Hz) by which the engine sound excites a sound field in the air duct 10.

Because a unit conversion method is obvious and it is also obvious that the air column resonance is generated in case the converted excitation frequency and the first air column resonance frequency are matched, a detailed description thereof will be omitted.

In general, the vehicle is gradually accelerated immediately after the vehicle begins to move, and in this case, size of acoustic excitation from the engine is very small.

Therefore, when the first air column resonance frequency is positioned in a section of the engine RPM in which the vehicle is gradually accelerated by tuning L1+L2, D1, and D2, the problem with additional noise due to the air column resonance at a low RPM can be effectively solved.

In particular, since the size of acoustic excitation from the engine becomes smaller as the RPM becomes lower, the method of minimizing the first air column resonance frequency is the best method.

Since the variable valve 40, which is positioned at one end of the first flow path 31 toward the first inlet 21, is opened at a high RPM, intake flow resistance becomes low, engine output is increased, and the length of the flow path of the air duct 10 becomes L1.

Accordingly, in Formula 1, the length of the air column can be substituted with L1, and the diameter of the air column D1.

According to Formula 1, the air column resonance is generated in case the engine RPM is relatively high.

The reason is because the first air column resonance frequency becomes relatively greater in accordance with Formula 1. To generate the air column resonance, the first air column resonance frequency needs to be positioned in an RPM section for common use when the vehicle travels.

Therefore, when the first air column resonance frequency becomes increased to deviate from the engine RPM section for common use, that is, a section of 2,000 to 5,000 RPM by tuning L1 and D1, the problems with not only discharge sound of an engine but also additional noise due to the air column resonance can be simultaneously solved.

The principle for solving the problem with discharge sound of an engine has been described in the aforementioned description associated with FIG. 3.

Figure 14:
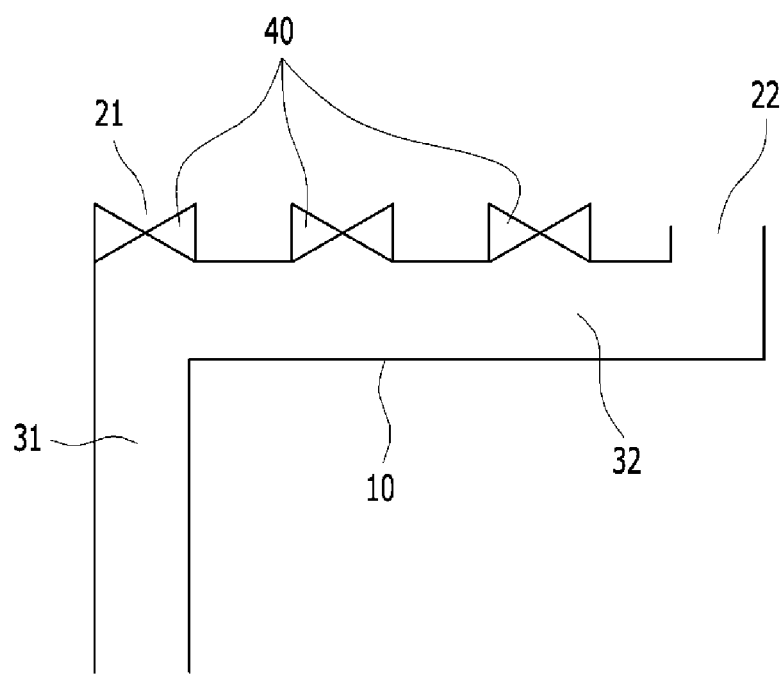
FIG. 14 is a schematic view illustrating a state in which a plurality of variable valves according to yet another exemplary embodiment of the present invention is installed.

FIG. 14 is a schematic view illustrating a state in which a plurality of variable valves according to yet another exemplary embodiment of the present invention is installed.

According to yet another exemplary embodiment of the present invention, discharge sound of an engine may be attenuated, and sporty or dynamic sound, which emphasizes frequencies of a desired bandwidth, may be developed by changing a position of the variable valve 40.

That is, since sound tone is changed by moving the first inlet 21 toward the second inlet 22, desired sound tone may be set in advance.

In addition, a plurality of variable valves 40 may be applied to the single air duct 10 according to positions for tuning as illustrated in FIG. 14, or a plurality of air ducts 10 having the variable valve 40 according to the exemplary embodiment of the present invention may be provided. As a result, it is possible to more precisely tune engine sound.

As described above, according to an exemplary embodiment of the present invention, difficulty in configuring a plurality of air ducts in the variable intake system can be solved, reduction of costs and weight can be achieved on account of no application of actuators, and simultaneously a prior design objective to attenuate discharge sound of an engine at a low RPM and reduce flow resistance of intake air at a high RPM can be achieved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A variable intake system which has an air duct that guides intake air into an engine and a variable valve comprising a valve flap having a variable opening degree to adjust an amount of the intake air, wherein the air duct includes a first inlet and a second inlet that are opened to an outside, wherein the air duct has a first flow path having one end connected with the first inlet and a second flow path having one end connected with the second inlet, wherein the second flow path shares a part of the first flow path, wherein another end of the first flow path and another end of the second flow path share a same outlet, wherein a length of the second flow path is longer than a length of the first flow path, and wherein the valve flap has a shape in which a lower portion of the valve flap is bent to form a predetermined angle with an upper portion of the valve flap in a cross section of the valve flap in the length direction of the first flow path or a shape in which the valve flap gradually curves toward the lower portion thereof, such that a lower end of the valve flap is spaced apart from an extended line which connects a center of the valve hinge and the upper portion of the valve flap in a direction in which the valve flap is opened, in a cross section of the valve flap in the length direction of the first flow path.

2. The variable intake system of claim 1, wherein a cross section of the first flow path is larger than a cross section of a portion of the second flow path which is not shared with the first flow path.

3. The variable intake system of claim 1, wherein an opening degree of the variable valve is varied by a variation in pressure in the air duct in accordance with a variation in an amount of the intake air.

4. The variable intake system of claim 3, wherein the variable valve is mounted at the one end of the first flow path to open and close a part of the first flow path which is not shared with the second flow path.

5. The variable intake system of claim 4, wherein when the variable valve is opened, all of the air flowing in through both the first inlet and the second inlet is supplied to the engine, and when the variable valve is closed, only air flowing in through the second inlet is supplied to the engine.

6. The variable intake system of claim 5, wherein when the variable valve is closed or when the variable valve is opened, air column resonance frequency is adjusted to be increased or decreased in accordance with Air Column Resonance Frequency =

$$\frac{\text{Sound Velocity}}{2 \times (\text{Length of Air Column} + 0.3 \times \text{Diameter of Air Column})} \times \text{Integer}(1, 2, \ldots),$$

wherein a length of the first flow path is L1, a length of a portion of the second flow path, which is not shared with the first flow path, is L2, a length of the second flow path is L1+L2, a diameter of a cross section of the first flow path is D1, a diameter of a cross section of a part of the second flow path, which is not shared with the first flow path, is D2, when the variable valve is closed, a length of the air column is L1+L2 and a diameter of the air column is an arbitrary value associated with D1 and D2, and when the variable valve is opened, the length of the air column is L1 and the diameter of the air column is D1.

7. The variable intake system of claim 4, wherein the valve flap rotates on an axis perpendicular to a length direction of the first flow path and has a shape that is selectively substantially identical to a cross section of the first flow path.

8. The variable intake system of claim 7, wherein the variable valve further includes:

a valve hinge which is an axis on which the valve flap rotates; and a valve spring which has one end supported by the valve flap and another end supported by the air duct, and provides restoring force to the valve flap which rotates on the valve hinge as a rotation axis.

9. The variable intake system of claim 8, wherein the variable valve further includes a valve stopper which is formed or mounted at a left end portion or a right end portion from the valve hinge in a cross section of the variable valve in a length direction of the first flow path.

10. The variable intake system of claim 9, wherein the valve hinge is positioned at an upper portion in a cross section of the first flow path in the length direction thereof, and wherein the valve stopper is an elastic member that is mounted at an end portion of the valve flap which is adjacent to the valve hinge.

11. The variable intake system of claim 4, wherein a plurality of the first inlets are formed, a plurality of the first flow paths are formed accordingly, and wherein the at least one variable valve is selectively mounted at at least one end of the plurality of the first flow paths.

12. The variable intake system of claim 4, wherein a plurality of the air ducts are provided.

13. A variable intake system which has an air duct that guides intake air into an engine and a variable valve comprising a valve flap having a variable opening degree to adjust an amount of the intake air, wherein the air duct includes a first inlet and a second inlet that are opened to an outside, wherein the air duct has a first flow path having one end connected with the first inlet and a second flow path having one end connected with the second inlet, wherein the second flow path shares a part of the first flow path, wherein another end of the first flow path and another end of the second flow path share a same outlet, wherein a length of the second flow path is longer than a length of the first flow path, and wherein a stopping projection or a stopping groove is formed or mounted at an upper side or a lower side of a cross section of the air duct in the length direction thereof so that an upper end or a lower end of the valve flap is caught by the stopping projection or the stopping groove so as for the valve flap to be stopped.

* * * * *